United States Patent [19]
Goetz et al.

[11] 4,134,683

[45] Jan. 16, 1979

[54] MULTISPECTRAL IMAGING AND ANALYSIS SYSTEM

[75] Inventors: Alexander F. H. Goetz, Altadena; Frederick P. Landauer, Jr., South Pasadena, both of Calif.

[73] Assignee: The United States of America as represented by the Administrator of the National Aeronautics and Space Administration, Washington, D.C.

[21] Appl. No.: 664,091

[22] Filed: Mar. 5, 1976

[51] Int. Cl.$^2$ .............................................. G01J 3/48
[52] U.S. Cl. .................................... 356/407; 250/226; 356/300; 356/416
[58] Field of Search ........................ 356/51, 74, 77, 95, 356/98, 106 S, 173, 178, 186, 188, 189; 250/330, 332, 226; 178/DIG. 8, 20

[56] References Cited

U.S. PATENT DOCUMENTS

| 3,684,378 | 8/1972 | Lord ................................... 356/95 X |
| 3,702,735 | 11/1972 | Potter, Jr. ......................... 356/106 S |
| 3,973,118 | 8/1976 | La Montagne ...................... 250/226 |

*Primary Examiner*—F. L. Evans

*Attorney, Agent, or Firm*—Monte F. Mott; Robert Kinberg; Paul F. McCaul

[57] ABSTRACT

A multispectral imaging and analysis system incorporating the use of charge coupled devices or linear arrays of detectors and which is designed to permit on-board analysis of data in real time is disclosed. An imaging system including several arrays of charge coupled devices or linear detector arrays are used to obtain simultaneously spectral reflectance data of different wavelengths for a target area. A plurality of filters each accommodating a particular bandwidth are individually associated with each array. Data from the arrays are read out in parallel and applied to a computer or microprocessor for processing. The micro-processor serves to analyze the data in real time and as may be possible in accordance with hard-wired algorithms. The data are then displayed as an image on an appropriate display unit and also recorded for further use. The display system may be operationally connected to receive a terrain image such that the target area and the analyzed spectral reflectance data are superimposed and simultaneously displayed.

8 Claims, 5 Drawing Figures

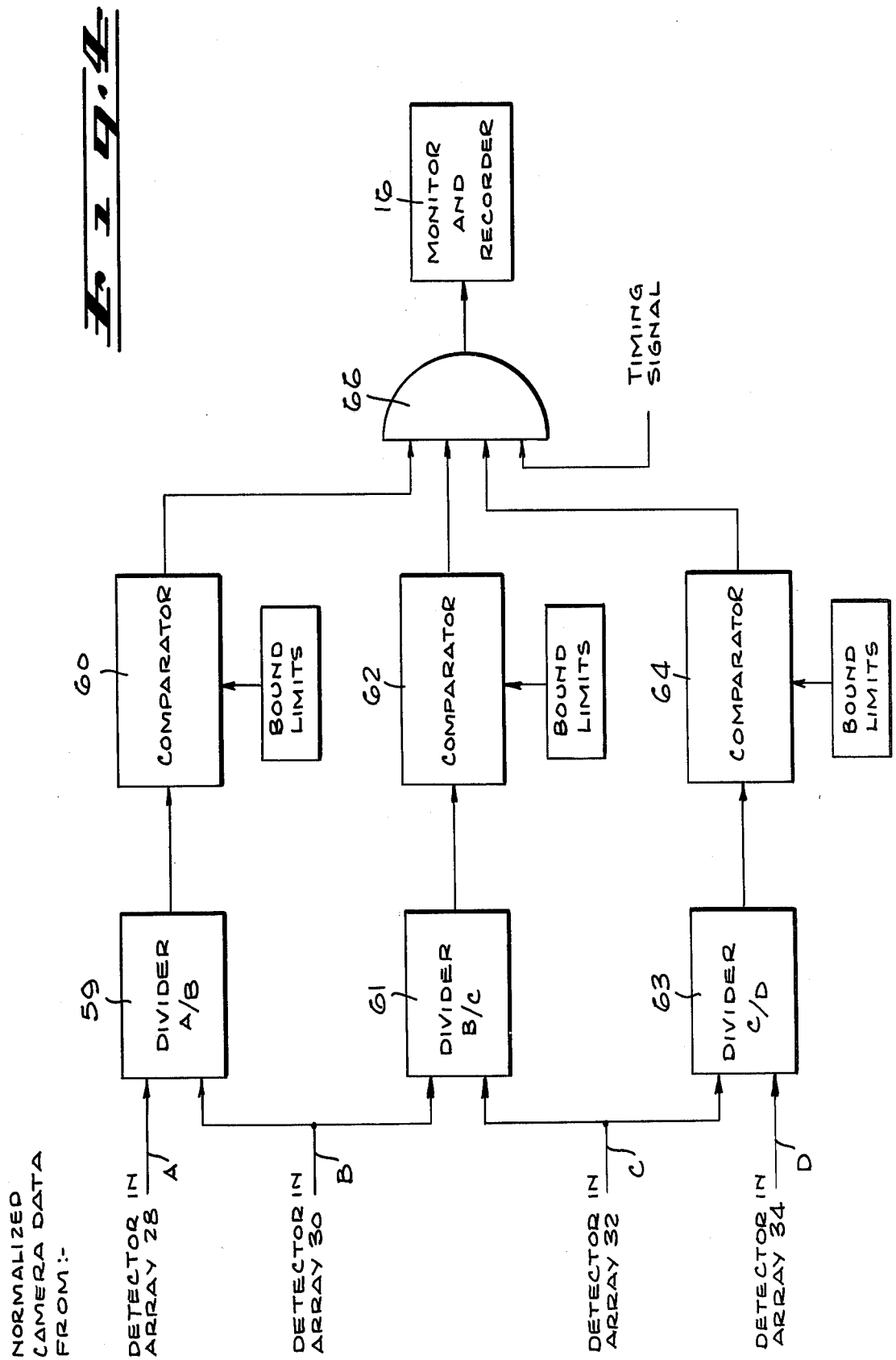

MULTISPECTRAL IMAGING AND ANALYSIS SYSTEM

BACKGROUND OF THE INVENTION

1. ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

2. FIELD OF THE INVENTION

This invention generally relates to the field of analysis of spectral reflectance data and devices used for obtaining and analyzing spectral reflectance data. More specifically, the present invention concerns a multispectral imaging and analysis system which takes advantage of charge coupled device (CCD) and linear detector array technology and which is designed to have data collected, analyzed and displayed on a real-time basis.

3. DESCRIPTION OF THE PRIOR ART

Geographical surveys of the earth's surface are today conducted by numerous different airborne systems. As an example, satellite technology is the means by which substantial amounts of data concerning the earth's surface are collected. Specifically, the earth resources technology satellite (ERTS) now called LANDSAT has produced images of the earth in four spectral bands with an instantaneous field of view of approximately 79 meters, i.e., the approximate size of a football field. As another example, the SKYLAB multispectral scanner produces an image in 13 spectral bands with a picture element size generally similar to that of the earth resources technology satellite.

Data collected by such satellite-borne systems and other aircraft-borne systems are typically transmitted to earth stations after collection or during collection thereof. The recorded data once received at the earth stations are then converted to a form that is useable with conventional general purpose computers and provided to users. At present, there is an approximate two months delay between the collection of data by satellite and such data being provided to a user.

A part of the substantial delay is due to satellite-borne systems being designed to accommodate the requirements of several different users. For example, the LANDSAT satellites obtain data in broad spectral bands continuously for a number of different applications. This being the case, the data collected is in large measure neither pertinent to nor useable by most of the users who are primarily interested in a small selected portion of the total data collected. Accordingly, once the data is collected by the satellite and provided to the user, such data must still be processed with a general purpose computer for the purpose of isolating that data which is relevant to a user's specific requirements. The initial sorting process has been found to be very time consuming and, of course, contributes to an increased cost of the data processing. At present, analyzing a single picture with a general purpose computer costs in the neighborhood of $2,000 to $5,000. Clearly, the time delay involved in obtaining the data and ultimately having the data processed by a general purpose computer is, for many applications too long, and may even render the data untimely and substantially useless.

Satellite and airborne multispectral surveys of the earth's surface have been found to be useful in detecting geographic areas of hydrothermal alteration which may be indicative of base-metal mineralization. Specific algorithms, taking advantage of known spectral reflectance characteristics, are readily able to be formulated and converted into interchangeable microcircuit memory elements and used for analysis with micro-processors. There are known sets of algorithms which, when combined with predetermined sets of optical filters, may be used with the present invention to explore for, among others, oil spills, algae blooms in lakes and blight on vegetation, as well as mineralization.

It is, therefore, the intention of the present invention to provide an imaging and analysis system that may be readily carried aboard an aircraft or satellite, and which may be used to collect, analyze and record in real time, spectral reflectance data for target areas on the earth's surface.

OBJECTS AND SUMMARY OF THE INVENTION

It is a primary object of the present invention to provide an imaging and analysis system which will serve to collect, analyze and record spectral reflectance data in real time.

It is another object of the present invention to provide a system for collecting spectral reflectance data that is portable and is capable of efficient usage to obtain accurate data that can be analyzed expeditiously and economically.

It is a further object of the present invention to provide a system which may be readily carried aboard an aircraft or satellite for conducting geographic surveys of the earth's surface.

It is yet another object of the present invention to provide a system which is compact and which may be readily used to survey for a plurality of different phenomena.

Briefly described, the present invention involves a portable, multispectral imaging and analysis system which is useful for collecting and analyzing spectral reflectance data of the earth's surface, which data is analyzed in real time.

More particularly, the subject invention includes an imaging system including a plurality of CCD detector arrays or linear detector arrays which are optically stacked and registered to be illuminated through an optical system wherein a plurality of matching filters are used to have only radiation in selected bandwidths incident on each different detector array. Collected spectral reflectance data is outputed to an on-board computer or micro-processor which serves to analyze the data in real time. Conventional data recorders and display units may be used to have the analyzed reflectance data concurrently displayed as a superimposition on a real image of the earth being surveyed.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 4 is a schematic diagram illustrating a circuit that may be used to implement an exemplary algorithm for analyzing spectral reflectance data such as is presented by FIGS. 3A and 3B.

DESCRIPTION OF THE PREFERRED EMBODIMENT

Figure 1:
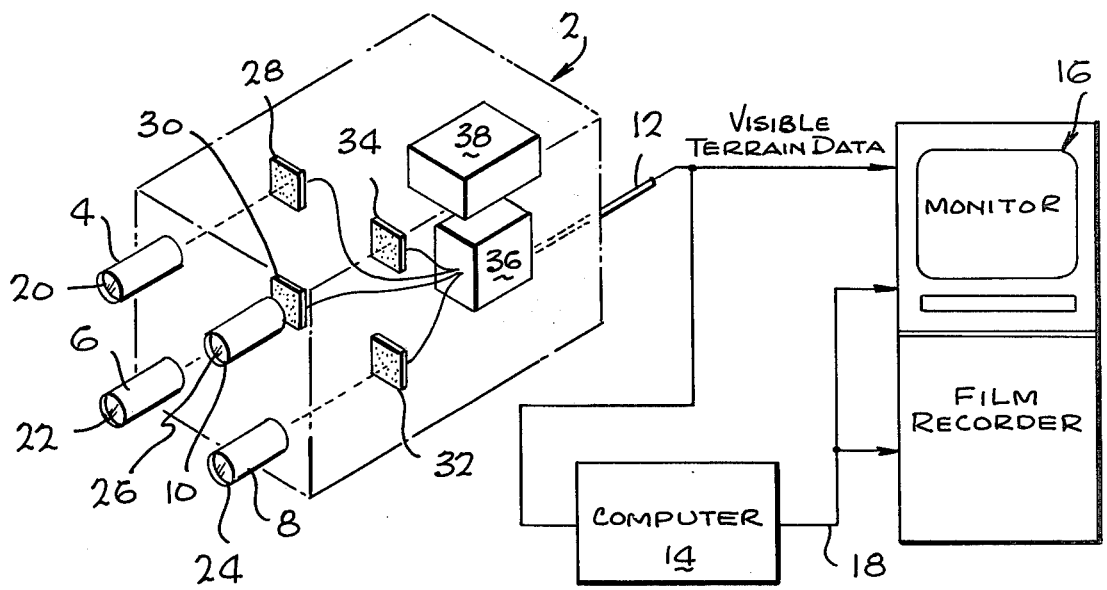
FIG. 1 is a schematic block diagram illustrating a multispectral imaging and analysis system in accordance with the present invention.

Referring to FIG. 1 of the drawings, solar energy at various wavelengths is reflected from terrain under observation and is received by an imaging system through a plurality of lens systems 4, 6, 8 and 10. Data in the form of electrical signals which are provided at the output of the imaging system 2 may be applied via an appropriate electrical cable 12 to a computer or micro-processor 14. The data output of the micro-processor 14 may thereafter be applied in the form of suitable video signals to an information recorder and display unit 16 via an appropriate cable 18 for recordation and/or display.

As shown, the lenses 4, 6, 8 and 10 may each be provided with a changeable filter 20, 22, 24 and 26 respectively. Such filters 20, 22, 24 and 26 serve to limit incident radiation transmitted through the corresponding lens to preselected bandwidths chosen for use in the analysis of data.

It is clear that the various lenses 4, 6, 8 and 10 may be of a conventional type and may be even replaced by an optical system having a single lens which is followed optically by dichroic plates and lenses in a configuration similar to a color television camera wherein incident light is split up into several primary colors for application to a plurality of color vidicons, in this case detector arrays.

In the imaging system 2 shown in FIG. 1, each of the lens systems 4, 6, 8 and 10 have associated therewith a separate CCD array 28, 30, 32 and 34. The outputs of the respective CCD arrays 28, 30, 32 and 34 may be appropriately connected electrically to a preamplifier and signal conditioning system 36 which shall be described in greater detail in connection with FIG. 2.

Timing logic circuitry 38 of conventional design may be used in a manner well known in the prior art to have the data read out from the individual detector arrays in parallel.

Conventionally, CCD arrays that are presently available may include 160,000 detector elements in a 400 × 400 array. Such CCD arrays may be thermo-electrically cooled in a conventional manner. The present intended application utilized four arrays 28, 30, 32 and 34 which are registered such that the same element located on each array receives radiation reflected from the same point on the targeted terrain. Information or data would be concurrently read out of each of the four CCD arrays 28, 30, 32 and 34 in parallel, that is, from corresponding detector elements at the same time. The mean for triggering each array to have data from successive detectors outputted is well known in the art and therefore is not considered required to be explained in detail herein. Data that is retrieved or outputted by the CCD arrays is analyzed by being applied to the computer 14.

Each detector in an array has characteristics that may be different from every other detector. The differences in characteristics reside primarily in the dark current appearing as a DC offset and the inherent gain of the detector. Accordingly, the DC offset and the gain of each individual detector in an array must be normalized.

Figure 2:
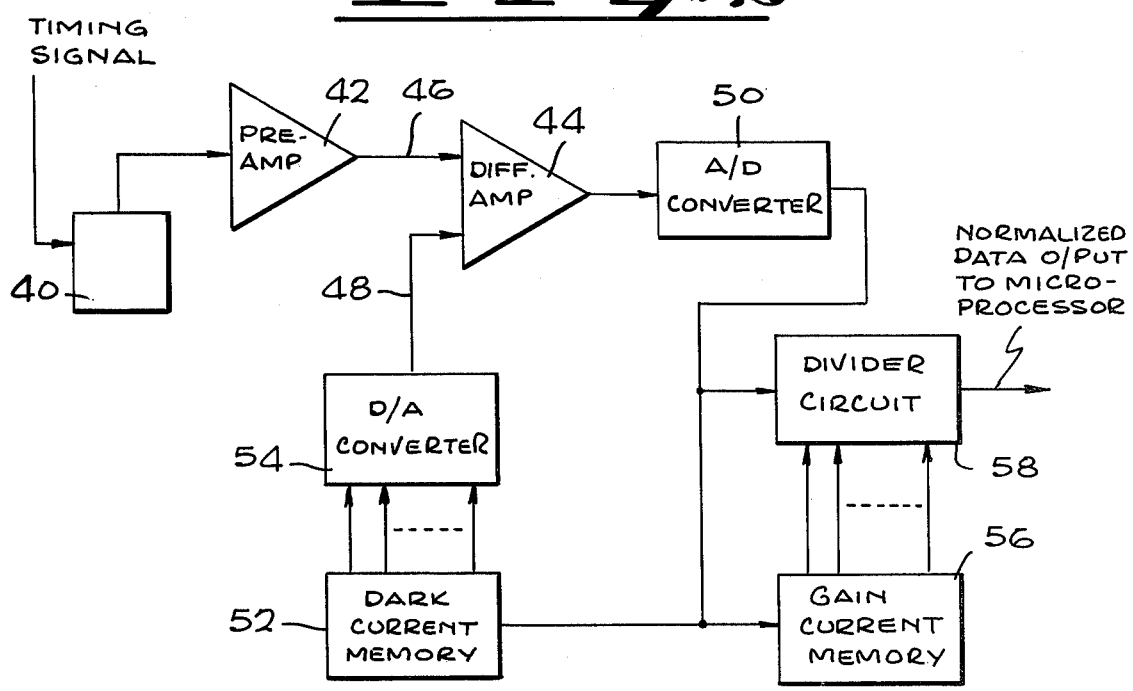
FIG. 2 is a schematic block diagram illustrating exemplary electronics that may be used in connection with the detector elements in each array for the purpose of normalizing output signals provided by the detectors.

Referring to FIG. 2, an exemplary circuit that is suitable for normalizing the DC offset and gain of CCD detectors or a conventional line array is illustrated. As shown, the output of each detector 40 is applied to a preamplifier 42 the output of which is applied as one of two inputs to a differential amplifier 44 via a first input lead 46. Assuming that the input signal applied to the second input lead 48 of the differential amplifier 44 is initially zero, then the initial output of the detector 40 from an image made while the lenses are capped can be thus applied to an A to D converter circuit 50 and thereafter applied to a memory 52 for storage. Normalization can thus be accomplished by having the dark current for all detectors stored and thereafter subtracted from the detector signal coming from illuminated terrain. Hence, the output of the memory 52 may thereafter be applied through a D to A converter circuit 54 as the second of two inputs to the differential amplifier 44 via the input lead 48.

Using such a feedback arrangement, the dark current memory data is subtracted from each detector signal that is provided when the detector is illuminated and the DC offset is thereby normalized.

The inherent gain of the detector 40 may be similarly normalized by a feed forward arrangement in which the gain current of the detector 40 is applied from the A to D converter circuit 50 to a gain current memory 56 and to a divider circuit 58 which serves to effectively normalize the inherent gain of the detector 40 by dividing outputted signals by the inherent gain.

The output of the divider circuit 58 would hence represent a normalized data output of the detector 40 which may be thereafter applied as an input to the computer or micro-processor 14.

It is understood that all of the circuits discussed and described heretofore with respect to FIG. 2 may be conventional circuits, that are commercially available and of a type that are well known in the prior art as to structure, operation and use.

It is noted that the dark current memory 52 and the gain current memory 56 may each be a small portion of a much larger memory circuit of conventional type that may be used for the purpose of storing all of the data from each of the detector arrays 28, 30, 32 and 34. In the event that a single memory is used for such purpose it must of course be assumed that the capacity of the memory is sufficiently large to accommodate storage of all of the data and other signals to be used for detector signal normalization as has been heretofore discussed. It is noted that the present state of the art permits any number of different procedures to be used for the purpose of accomplishing storage and/or retrieval of data in data memory circuits, and any of the conventional techniques may be used as may be appropriate.

With the exception of the memory circuits 52 and 56, it may be regarded that the circuitry of FIG. 2 be a part of the imaging system 2 that has been described in conjunction with FIG. 1.

Figure 3A:
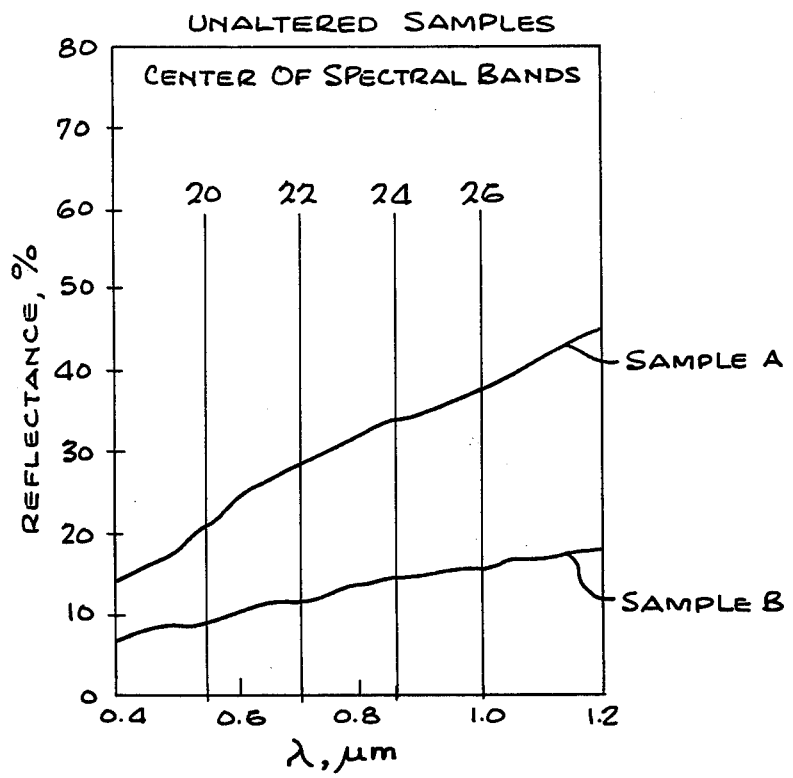
FIGS. 3 and 3B illustrate a pair of graphs presenting spectral reflectance data for certain unaltered and altered rock samples, respectively.
Figure 3B:
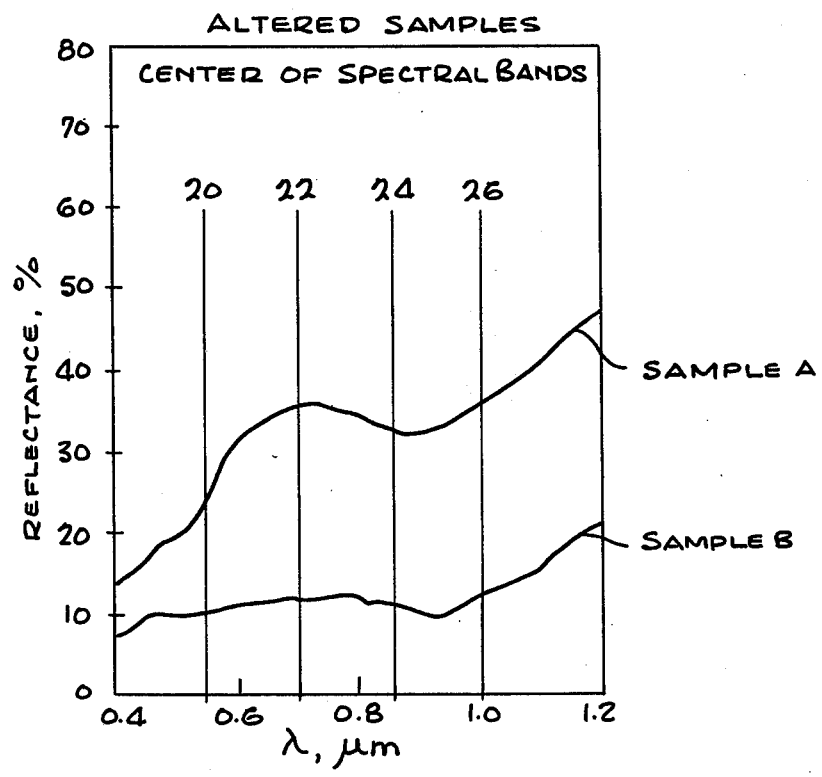

Referring now to FIGS. 3A and 3B, graphic presentations of spectral reflectance data for unaltered samples A and B, and altered samples A and B are illustrated. It may be observed that the graphs pertinent to the unaltered and altered samples A may be readily distinguished. The same holds true for the Samples B. Of the several methods by which such graphs can be distinguished, taking certain ratios of the data values at preselected wavelengths is effective, accurate and possible to be accommplished expeditiously. Selected wavelengths are noted by the vertical lines indicated by the numerals 20, 22, 24 and 26 which correspond to the filters earlier referred to in conjunction with FIG. 1. It is anticipated that such filters 20, 22, 24 and 26 may each have a bandwidth of 0.02 microns and be centered at wavelengths of 0.55 microns, 0.70 microns, 0.85 microns and 1.0 microns, respectively.

Referring to FIG. 4, a quasi-logic circuit representing an exemplary algorithm which serves to implement the above-mentioned calculation and comparison of ratios to known data sets is shown. The algorithm may be readily programmed into a micro-processor or computer 14. It is anticipated that, each algorithm be constructed in the form of an interchangeable microcircuit memory element.

The output of a detector from the array 28 associated with the filter 20 would be ratioed with the corresponding detector output of the array 30 associated with the filter 22. Similar ratios are formed between detector outputs for the arrays 30 and 32 and detector outputs for the arrays 32 and 34. The calculation of such ratios may be readily accomplished by the use of conventional divider circuits 59, 61 and 63.

It is of course understood that such ratios simply provide an indication of the slope of the graphic data between data points corresponding to the filters 20, 22, 24 and 26. Increasing the number of different filters and hence data points would, increase the accuracy of the analysis. However, the use of four filters is anticipated to be sufficient for most cases.

The ratios produced are compared to known values by having the ratio data signals applied to comparator circuits 60, 62 and 64. In this manner, the slope of data graphs being analyzed can be accurately compared to known data graphs for materials likely to be observed. As is well known in the prior art, the comparator circuits 60, 62 and 64 may include the use of threshold circuits which serve to provide output signals only where a ratio value falls between pre-determined bounds.

The outputs of the comparator circuits 60, 62 and 64 may thereafter be applied as inputs to an AND gate 66. An output from the AND gate 66 would indicate that collected data favorably compares to a known standard. Analyzed data would, be thereafter applied via the cable 18 from the computer 14 to the monitor and film recorder 16 for displaying and recordation for future use as shown in FIG. 1.

Referring again to FIG. 1, the monitor 16 may be equipped to have applied thereto visible terrain data which may be provided from any of the optical units 4, 6, 8 and/or 10. Such visible terrain data may simply be unprocessed data from any of the optical units. As may be desired, an additional camera may be used to provide visible terrain data.

The monitor and recorder unit 16 may thus be used to display both the visible terrain data, as well as the spectral reflectance data, for the sample being sought. When spectral reflectance data is superimposed on the visible terrain data and displayed, materials or conditions being sought and located may appear as dark spots or areas on the display of visible terrain data. The presence of such material being sought as well as its location on the terrain being covered by the airborne imaging system would thus be indicated.

Operationally, the optical units 4, 6, 8 and 10 are mounted and aligned to have each of the arrays 28, 30, 32 and 34 optically stacked and registered at infinity. When so registered, paralax is not considered to present a significant problem when the system is operated at a reasonable altitude; i.e. 10,000 feet or higher.

When the system in accordance with the subject invention is borne by an aircraft traveling at 140 miles per hour and at an elevation of 10,000 feet, the instantaneous field of view of each detector is approximately 200 microradians which corresponds to a resolution of 0.6 meters/picture element. The same airborne system when traveling at approximately 550 miles per hour at 40,000 feet will provide a resolution of approximately 2.5 meters/picture element.

It is to be understood that the use of charge coupled devices of conventional type now available commercially will limit the operational bandwidth of the subject system to wavelengths accommodated by the detectors, i.e., 0.4 to 1.0 microns.

It is to be understood that although a square detector array has been described and discussed in the foregoing description, line arrays may be used equally well. When a line array is used, rather than having a target picture taken at predetermined intervals, data would be continually read out of the line array associated with each optical unit as it is swept across the target area beneath the aircraft or satellite.

From the foregoing discussion it is now clear that the subject invention provides an imaging and analysis system whereby spectral reflectance data may be collected by an airborne system and immediately processed in real time such that the data can be also displayed in real time and recorded for future use. Clearly, the subject invention provides a compact system which is economically useable to provide data on an immediate basis as compared to prior art systems which require a user to wait a period of several months before having the collected data made available for yet subsequent expensive analysis by having the data applied to general purpose computers.

While a preferred embodiment of the present invention has been described hereinabove, it is intended that all matter contained in the above description and shown in the accompanying drawings be interpreted as illustrative and not in a limiting sense, and that all modifications, constructions and arrangements which fall within the scope and spirit of the invention may be made.

What is claimed is:

1. A system for receiving and analyzing incident radiation reflected from the earth's surface in real time, which system is suitable for geographic surveying from airborne vehicles, said system comprising:
   imaging means for receiving said incident radiation, said imaging means including:
   a plurality of detector arrays maintained in optically stacked registration, said detector arrays each including an array of charge coupled devices wherein said charge coupled devices of each said array are maintained in registration with corresponding devices in every other array, said arrays providing detector signals indicative of radiation incident thereon, optical means for permitting only incident radiation having different preselected wavelengths to be incident on each of said detector arrays; and normalizing circuit means for normalizing the dark current offset and the inherent gain of each said charge coupled device in said detector arrays;

data processing means for analyzing said detector signals applied thereto in accordance with preselected algorithms peculiar to the spectral reflectance characteristics of selected materials for identifying said selected materials; said processing means providing data signals; and display means for receiving said data signals and detector signals for concurrently displaying said detector signals as an image of the earth's surface indicating the location of said selected materials.

2. The system defined by claim 1, said optical means including:

a plurality of lens means for each directing incident radiation onto a different one of said detector arrays; and a plurality of filter means for limiting the passage of incident radiation through a different one of said plurality of lens means to radiation having preselected wavelengths.

3. The system defined by claim 2, said optical means including an equal number of lens means and filter means, each said filter means permitting the passage of radiation having different preselected wavelengths.

4. The system defined by claim 3, said system including a number of detector arrays that is equal to the number of lens means included in said system.

5. The system defined by claim 4, said detector arrays being square arrays.

6. The system defined by claim 4, said detector arrays being line arrays.

7. The system defined by claim 1, said detector signals being concurrently read out from corresponding charge coupled devices included in said plurality of detector arrays.

8. The system defined by claim 1, said normalizing circuit means including:

means for storing a dark current offset signal for a corresponding charge coupled device and having said dark current offset signal subtracted from the detector signal provided from said corresponding charge coupled device; and means for storing a gain signal for a corresponding charge coupled device and having the detector signal provided by said charge coupled device divided by said gain signal.

* * * * *